(12) United States Patent
Bendlin et al.

(10) Patent No.: US 11,064,449 B2
(45) Date of Patent: Jul. 13, 2021

(54) OVER THE AIR SYNCHRONIZATION OF NETWORK NODES

(71) Applicant: AT&T INTELLECTUAL PROPERTY I, L.P., Atlanta, GA (US)

(72) Inventors: Ralf Bendlin, Cedar Park, TX (US); Aditya Chopra, Austin, TX (US); Thomas Novlan, Cedar Park, TX (US); Milap Majmundar, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 76 days.

(21) Appl. No.: 16/543,305

(22) Filed: Aug. 16, 2019

(65) Prior Publication Data
US 2021/0051612 A1 Feb. 18, 2021

(51) Int. Cl.
*H04W 56/00* (2009.01)
*H04W 24/10* (2009.01)

(52) U.S. Cl.
CPC ......... *H04W 56/001* (2013.01); *H04W 24/10* (2013.01)

(58) Field of Classification Search
CPC ........................... H04W 56/001; H04W 24/10
USPC ....................................................... 370/350
See application file for complete search history.

(56) References Cited

U.S. PATENT DOCUMENTS

| 6,014,376 A | 1/2000 | Abreu et al. |
| 6,751,248 B1 | 6/2004 | Tan |
| 8,040,870 B1 | 10/2011 | Smidth et al. |
| 8,213,405 B2 | 7/2012 | Horn et al. |
| 8,705,508 B2 | 4/2014 | In et al. |
| 8,730,868 B2 | 5/2014 | Yamada et al. |
| 8,811,238 B2 | 8/2014 | Huang |
| 9,014,213 B2 | 4/2015 | Yeh et al. |
| 9,544,863 B2 | 1/2017 | Koorapaty et al. |
| 9,577,774 B2 | 2/2017 | Zhang et al. |
| 9,654,242 B2 | 5/2017 | Cao et al. |

(Continued)

FOREIGN PATENT DOCUMENTS

| EP | 2 369 880 A1 | 8/2013 |
| WO | 2009/030292 A1 | 3/2009 |

(Continued)

OTHER PUBLICATIONS

Schmidl et al., "Robust frequency and timing synchronization for OFDM." IEEE transactions on communications 45.12, Dec. 1997, 9 pages.

(Continued)

*Primary Examiner* — Faisal Choudhury
(74) *Attorney, Agent, or Firm* — Amin, Turocy & Watson, LLP

(57) ABSTRACT

The described technology is generally directed towards over the air synchronization of network nodes. In general, the techniques disclosed herein can be implemented by a first base station node device and a second base station node device. A wireless backhaul connection between the base station node devices allows the first base station node device to connect to a core network via the second base station node device. The techniques disclosed herein can be implemented as a protocol including communications back and forth between the base station node devices, which enables measurement of communication delays such as propagation delays and processing delays. The base station node devices can then use the measured communication delays to better synchronize clocks used to time radio frequency transmissions.

20 Claims, 11 Drawing Sheets

(56) References Cited

U.S. PATENT DOCUMENTS

| | | | |
|---|---|---|---|
| 9,713,110 B2 | 7/2017 | Lu et al. | |
| 9,749,972 B2 | 8/2017 | Bin Sediq et al. | |
| 2011/0170436 A1* | 7/2011 | Doan | H04B 7/155 370/252 |
| 2012/0014312 A1* | 1/2012 | Zhang | H04W 56/00 370/312 |
| 2012/0236765 A1 | 9/2012 | Huang | |
| 2015/0351063 A1* | 12/2015 | Charbit | H04W 56/0015 370/329 |
| 2016/0302165 A1* | 10/2016 | Da | H04W 56/002 |
| 2016/0366657 A1 | 12/2016 | Farkas et al. | |
| 2017/0064661 A1 | 3/2017 | Katagiri et al. | |
| 2017/0064731 A1 | 3/2017 | Wang et al. | |
| 2017/0150464 A1 | 5/2017 | Kazehaya et al. | |
| 2017/0223651 A1 | 8/2017 | Patel et al. | |
| 2017/0366287 A1 | 12/2017 | Zeng et al. | |
| 2019/0109745 A1 | 4/2019 | Abedini et al. | |
| 2019/0342904 A1 | 11/2019 | Islam et al. | |

FOREIGN PATENT DOCUMENTS

| | | |
|---|---|---|
| WO | 2017/116447 A1 | 7/2017 |
| WO | 20171204702 A1 | 11/2017 |
| WO | 2019/246248 A1 | 12/2019 |

OTHER PUBLICATIONS

Zheng et al., "A novel timing and frequency synchronization scheme for MIMO OFDM system." Wireless Communications, Networking and Mobile Computing, WiCom 2007, International Conference, IEEE, 2007, 4 pages.

Wang et al., "Timing synchronization for MIMO-OFDM WLAN systems." Wireless Communications and Networking Conference, WCNC 2007, IEEE, 2007, 6 pages.

Ziabari et al. "Robust Timing and Frequency Synchronization for OFDM Systems", Ieee Transactions on Vehicular Technology, vol. 60, No. 8, Oct. 2011, 11 pages.

Guo et al., "A Novel Timing Synchronization Method for Distributed MIMO-OFDM System", 2006 IEEE, pp. 1933-1936.

Mochizuki et al., "A High Performance Frequency and Timing Synchronization Technique for OFDM", IEEE 1998, pp. 3443-3448.

Non-Final Office Action received for U.S. Appl. No. 16/101,917 dated Mar. 24, 2020, 108 pages.

* cited by examiner

OVER THE AIR SYNCHRONIZATION OF NETWORK NODES

TECHNICAL FIELD

The subject application is related to wireless communications systems in general, and to cellular communications systems in particular.

BACKGROUND

In traditional cellular communications systems, the base stations that provide wireless service to mobile subscribers connect back to a core network via physical cable connections, such as fiber or digital subscriber line (DSL) connections. Such physical connections may be referred to as physical or cable backhaul connections. Alternatively, a base station can wirelessly connect to another "donor" base station, which donor base station in turn can have a physical cable connection to the core network. This arrangement may be referred to as an over the air or wireless backhaul connection. Wireless backhaul connections provide cost savings, flexibility, and convenience due to eliminating the need to build physical cable infrastructure, such as excavating to bury underground cables.

Fifth Generation (5G) and subsequent generation communication systems show increased promise for wireless backhaul connections, in part due to the increased capacity of such systems. However, various technical challenges remain to be addressed. One challenge is the problem of synchronization: time division duplex (TDD) communications used for 5G wireless backhaul connections require synchronized timing of wireless transmissions by the various base stations. Better synchronization can result in better quality wireless backhaul connections with higher throughputs. Therefore, there is a need in the industry for technologies to improve synchronization of base station transmissions used for wireless backhaul connections.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
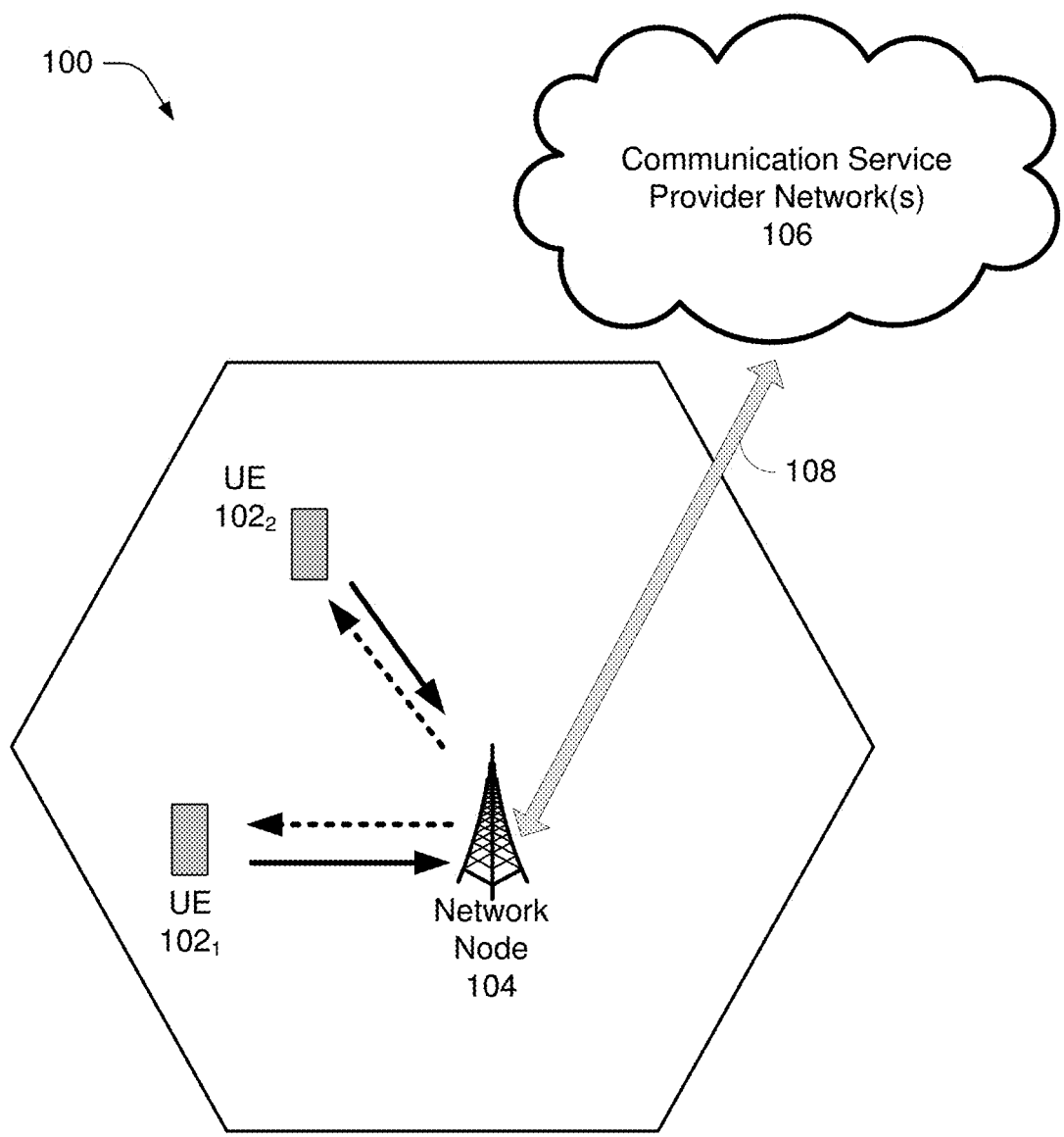
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards over the air synchronization of network nodes. In general, the techniques disclosed herein can be implemented by a first base station node device and a second base station node device. A wireless backhaul connection between the base station node devices allows the first base station node device to connect to a core network via the second base station node device. The techniques disclosed herein can be implemented as a protocol including communications back and forth between the base station node devices, which enables measurement of communication delays such as propagation delays and processing delays. The base station node devices can then use the measured communication delays to better synchronize clocks used to time radio frequency transmissions.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more user equipment UEs 1021, 1022, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 102 can also comprise IOT devices that communicate wirelessly.

In various embodiments, system 100 comprises communication service provider network(s) 106 serviced by one or more wireless communication network providers. Communication service provider network(s) 106 can include a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

Figure 2:
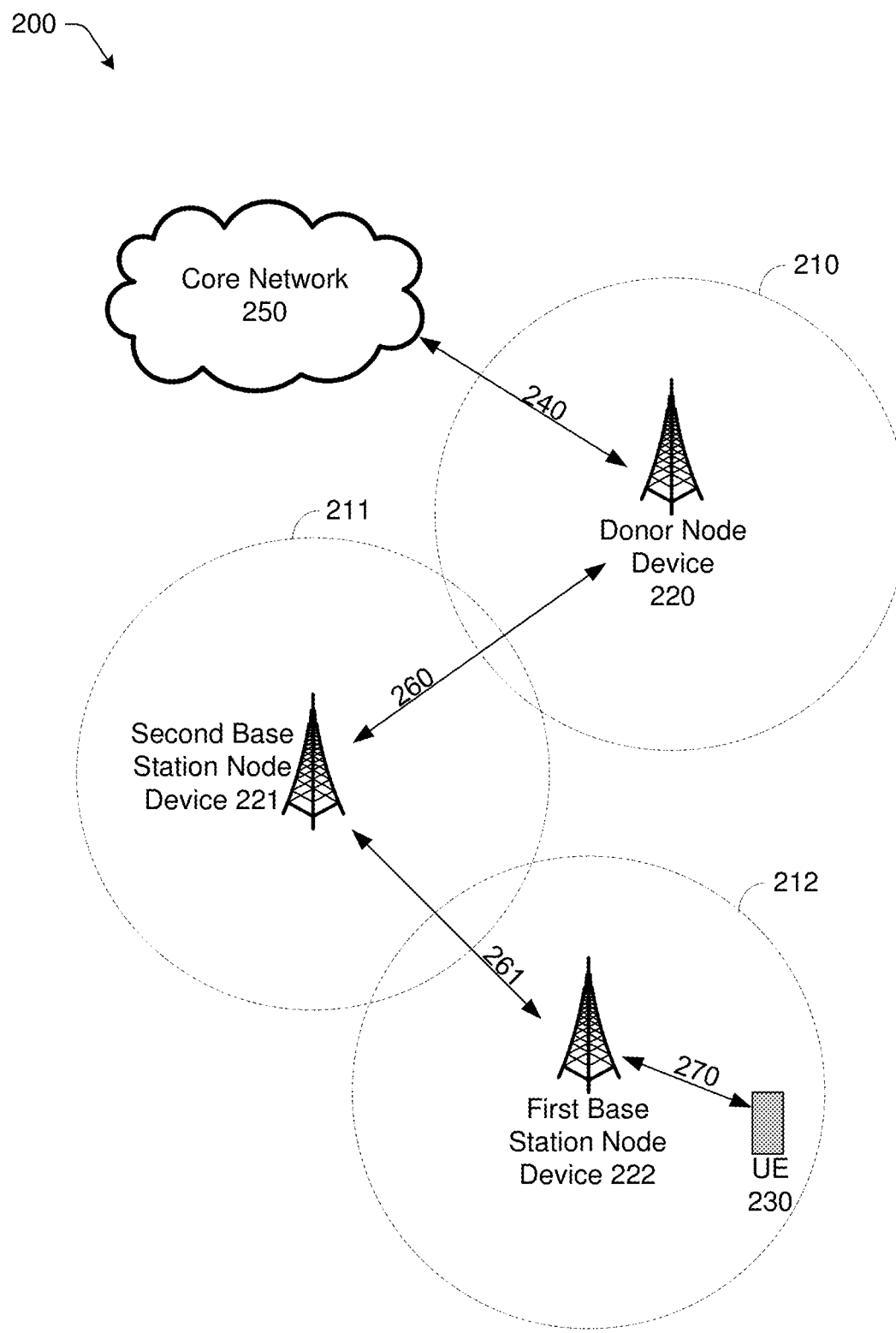
FIG. 2 illustrates an example integrated access and backhaul (IAB) network comprising a wireless backhaul connection between first and second base station node devices, in accordance with various aspects and embodiments of the subject disclosure.

A network node 104 can comprise a donor base station node or a relay base station node, as described further in connection with FIG. 2. A network node 104 can have a cabinet and other protected enclosures, computing devices, an antenna mast, and multiple antennas for performing various transmission operations (e.g., MIMO operations). Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

FIG. 2 illustrates an example integrated access and backhaul (IAB) network comprising a wireless backhaul connection between first and second base station node devices, in accordance with various aspects and embodiments of the subject disclosure. FIG. 2 includes an example cellular communications system 200 comprising three network nodes: a donor node device 220, a first base station node device 222, and a second base station node device 221. Donor node device 220 provides connectivity in geographical area 210, first base station node device 222 provides connectivity in geographical area 212, and second base station node device 221 provides connectivity in geographical area 211. A UE 230 connects to first base station node device 222 in whose coverage area (212) the UE 230 is situated, via a wireless communications link 270 according to an air interface specification, such as the 3rd Generation Partnership Project (3GPP) Universal Mobile Telecommunications System (UMTS), the 3GPP Long-Term Evolution (LTE) or the 3GPP New Radio (NR). The latter three communications standards are examples of so-called third, fourth and fifth generation cellular communications systems, viz., 3G, 4G, and 5G. Donor node device 220 connects to a core network 250 via a physical backhaul connection 240, for example, a fiber or DSL connection.

In a traditional wireless cellular communications system, the network nodes 220, 221, and 222 would each connect to the core network 250 via physical fiber or DSL cable connections. In the illustrated example, however, donor node device 220 connects to the core network 250 via the physical fiber or DSL cable connection 240, while second base station node device 221 connects to the core network 250 via a communication link 260 to donor node device 220, and first base station node device 222 connects to the core network 250 via a communication link 261 to second base station node device 221. For the purpose of this disclosure, at least communication link 261 can comprise a wireless backhaul connection.

In cellular communications system 200, a base station such as first base station node device 222, without a physical connection to the core network 250, can connect to a donor node device 220, with a physical connection to the core network 250, via one or more intermediate base stations, such as second base station node device 221, wherein the intermediate base stations may also lack physical connections to the core network 250, e.g., where communication link 260 is a wireless, rather than a physical communication link. This is referred to as multi-hop relaying. In this example, the donor node device 220 is said to be of hop order 0, second base station node device 221, which connects to donor node device 220, is said to be of hop order 1, first base station node device 222, which connects to second base station node device 221, is said to be of hop order 2, and so forth.

A base station node can comprise a UE function that communicates with its parent base station node via uplink channels and procedures, and a base station function that communicates with next hop order base station node(s) and access UEs. Each node of hop order n>0 connects to the core network 250 via n wireless backhaul connections to the donor node device 220. In this example, first base station node device 222 has a wireless backhaul connection 261 to second base station node device 221, which itself has a wireless backhaul connection 260 to donor node device 220, which ultimately has a physical cable connection 240 to the core network 250. Timing synchronization among a plurality of relay and donor nodes that connect to a core network 250 via two or more wireless hops is a problem which can advantageously be addressed by embodiments of this disclosure.

In existing cellular communications systems, timing synchronization can be achieved by several means, any of which can optionally be combined with the further techniques disclosed herein. In one example existing synchronization approach, network nodes 220, 221, and 222 can be equipped with Global Positioning System (GPS) receivers for timing alignment among them. Note, however, that GPS receivers may not work well for base stations that are deployed inside building structures, as GPS receivers generally utilize line-of-sight (LOS) links to multiple GPS satellites.

In another example existing synchronization approach, network nodes 220, 221, and 222 can be equipped with physical cable connections to a centralized server such that a cable based Precision Time Protocol (PTP), e.g., IEEE 1588, can be used to synchronize the network nodes 220, 221, and 222 via the cable connections. This solution, however, is less effective in the presence of latency and jitter on the cable connections to each network node.

In another example existing synchronization approach, radio interface based synchronization (RIBS) techniques can be used to achieve over-the-air (OTA) timing synchronization. RIBS uses physical connections to backhaul data between network nodes 220, 221, and 222 and the core network 250 as well as air interface techniques for timing synchronization of each network node. Network nodes in the wireless network 200 can be separated into masters (namely those network nodes that can be used as a timing reference) and slaves (those network nodes that acquire timing synchronization via master nodes). For example, a master node can be a macro base station that is equipped with a GPS receiver, whereas slave nodes can be small cell base stations that are deployed indoors in residential or enterprise premises. The slave nodes can have Ethernet connectivity to the core network 250 via DSL cables with significant jitter/delay and moreover, due to their indoor locations, may not use GPS for timing synchronization. For these types of slave nodes, RIBS can enable timing synchronization by means of reference or synchronization signals that are transmitted by a master node. A master node can signal via a system information broadcast that it can be used as timing reference. It then transmits one or more synchronization and reference signal waveforms, which slave nodes can use to align their frame boundary timing with that of the master. Note that while timing synchronization is obtained by reference signals that are transmitted via an air interface, in RIBS implementations, slave nodes also have wired backhaul connections for data transfer with the core network 250.

RIBS based techniques can be inefficient for multi-hop relay networks because only master nodes can be used for timing reference. For example, in a RIBS implementation, second base station node device 221 will experience a better link quality to donor node device 220 than first base station node device 222, because of closer proximity to donor node device 220. Generally, when RIBS based techniques are employed, the signal-to-interference-and-noise ratio (SINR) with which a slave node receives waveforms from a master node will degrade with increasing hop order. Hence, the cellular communications system 200 suffers from error propagation. In order to boost the SINR, RIBS based techniques can configure muting patterns among the transmissions of base stations to increase the SINR of slave nodes of higher hop order. These muting patterns, however, while increasing the SINR of the RIBS, deteriorate the overall spectral efficiency of the cellular communications system 200. Furthermore, in certain deployment configurations, radio connectivity between the master node and a higher order slave node may not be possible, for example, due to buildings or other structures, or large distances between master node and slave nodes.

In another example existing synchronization approach, a given network node of any hop order can use any other network node of arbitrary hop order as synchronization reference. In other words, no master nodes are configured that solely can serve as timing reference. A relay or IAB node first establishes a wireless link to another arbitrary node. The wireless link is then used to synchronize the relay or IAB node using a wireless Precision Time Protocol (PTP) implementation such as described in connection with FIGS. 3, 4, and 5. Consequently, a node of hop order n seeking timing synchronization need not use over-the-air waveforms other than from nodes of hop order n-1, unlike RIBS techniques where nodes of hop order n>0 all use over-the-air waveforms from a master node of hop order 0.

While the wireless PTP described in connection with FIGS. 3, 4, and 5 can synchronize timing in relay networks with IAB, such an approach can benefit by allowing network nodes, such as first base station node device 222, to request correction information from other network nodes, such as second base station node device 221, in order to correct for any offsets between the "master" clock (e.g. a clock at second base station node device 221) and the "slave" clock (e.g., a clock at first base station node device 222). Such offsets can arise, for example, from propagation delays between the network nodes 221, 222, as well as any processing delays internal to each network node 221, 222.

Figure 3:
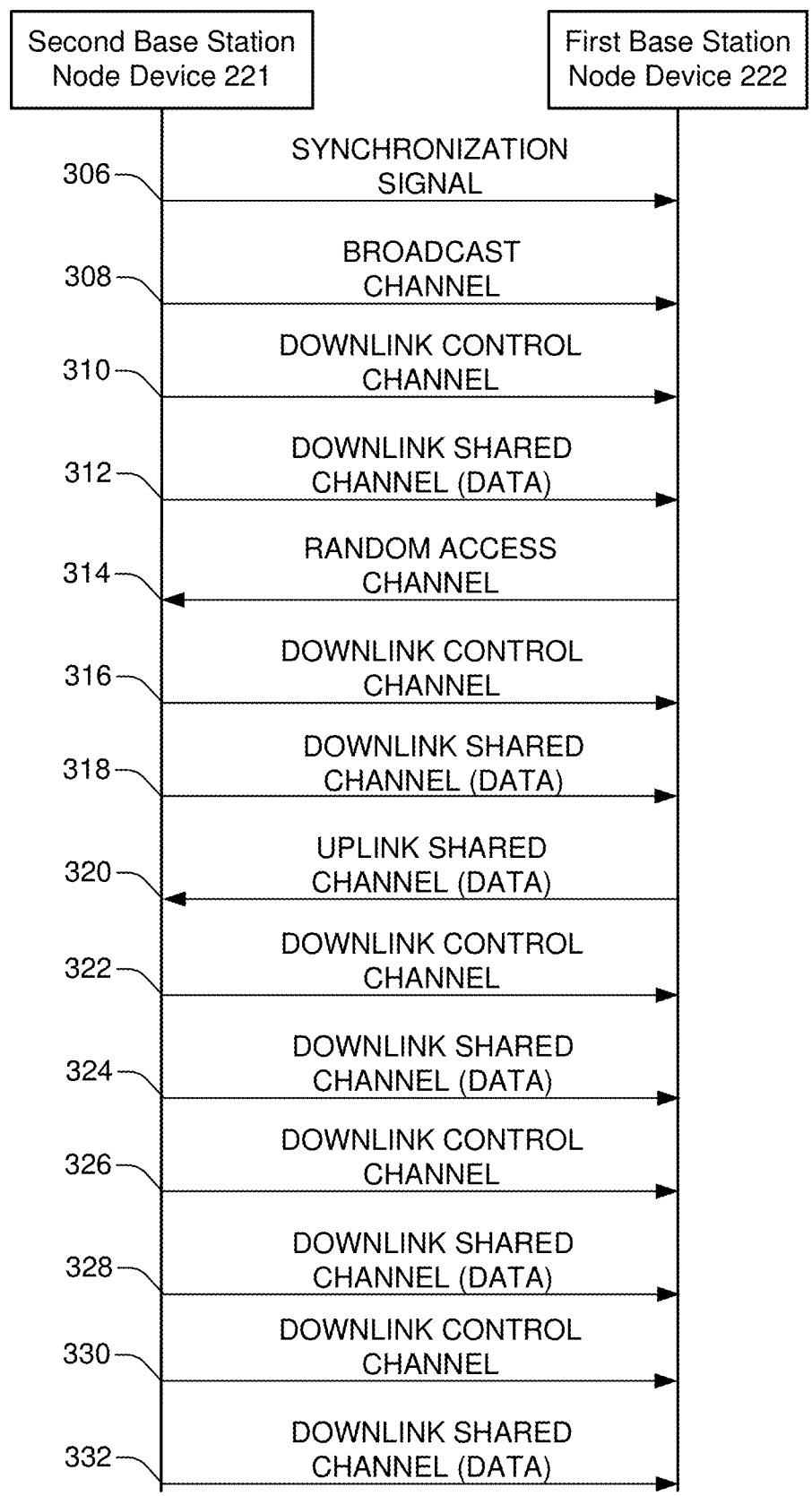
FIG. 3 provides an example message sequence for a Precision Time Protocol (PTP) to establish timing synchronization, in accordance with various aspects and embodiments of the subject disclosure.

FIG. 3 provides an example message sequence for a wireless Precision Time Protocol (PTP) to establish timing synchronization, in accordance with various aspects and embodiments of the subject disclosure. FIG. 3 illustrates a second base station node device 221 and a first base station node device 222, introduced in FIG. 2, along with a series of communications between the devices 221 and 222.

In general, second base station node device 221 can establish a donor/relay node relationship with a first base station node device 222 through a sequence of messages sent between the devices 221, 222. The messages implement a wireless PTP via an over the air interface. In the illustrated example, the second base station node device 221 is the donor node in the donor/relay node relationship, and may therefore be referred to as a donor node device 221, while the first base station node device 222 is the relay node in the donor/relay node relationship, and so may be referred to as the relay node device 221. The donor node device 221 is a node of hop order n-1, and the relay node device 222 is a node of hop order n.

In an embodiment, at 306, donor node device 221 can transmit a synchronization signal to relay node device 222. The synchronization signal 306 enables the relay node device 222 to obtain coarse time and frequency synchronization for reception of the broadcast channel 308 transmitted by donor node device 221. The payload of the broadcast channel transmission 308 enables relay node device 222 to receive remaining system information (RMSI) scheduled by physical downlink control channel (PDCCH) transmission 310 and transmitted by the physical downlink shared channel (PDSCH) transmission 312.

The payload of 312, namely, parts of the RMSI, can enable relay node device 222 to initiate a random access procedure by transmitting a physical random access channel (PRACH) transmission 314 to donor node device 221. Donor node device 221 can respond to the physical random access channel transmission 314 with a random access response (RAR) scheduled by physical downlink control channel (PDCCH) transmission 316 and transmitted by the physical downlink shared channel (PDSCH) transmission 318. Amongst others, the RAR 318 includes information for relay node device 222 to transmit a message on the physical uplink shared channel (PUSCH) transmission 320.

Physical downlink shared channel (PDSCH) transmission 324 is scheduled by physical downlink control channel (PDCCH) transmission 322 and can serve the purpose of contention resolution, if necessary. After contention resolution, one or more PDCCH 326 and PDSCH 328 transmissions can configure the relay node device 222 as a relay or IAB node. Subsequently, one or more PDCCH 330 and PDSCH 332 transmissions can configure a wireless PTP between relay node device 222 and a master clock associated with donor node device 221.

In an embodiment, donor node device 221 can configure relay node device 222 via a timing advance (TA) command to shift its transmission time in order to guarantee radio frame boundary alignment between the two base station devices 221, 222 according to some criteria. For example, donor node device 221 can configure relay node device 222 such that their respective radio frame boundaries are within a given accuracy of, for instance, three microseconds. In addition, relay node device 222 can continuously monitor waveform transmissions by donor node device 221 to autonomously correct its radio frame boundary timing.

The wireless PTP establishes, between relay node device 222 and a master clock associated with donor node device 221, a global timing reference in the cellular communications network 200. The PTP exchanges messages with relay node device 222 via PDSCH and PUSCH transmissions sent/received by donor node device 221 in order to establish sub-microsecond synchronization among nodes of cellular communications network 200.

In one embodiment, the PDSCH transmissions illustrated in FIG. 3 can comprise unicast transmissions between one JAB node (e.g., donor node device 221) and another JAB node (e.g., relay node device 222). In another embodiment, the illustrated PDSCH transmissions can comprise system information transmissions between one JAB node, e.g., donor node device 221 and multiple JAB nodes, such as relay node device 222 and multiple other devices at other relay nodes in the cellular communications network 200. In the one-to-many example, the PDSCH transmissions can be transmitted using common broadcast channels, such as PDSCHs which are scheduled by PDCCHs whose cyclic redundancy check (CRC) bits are scrambled by an SI-RNTI (System Information Radio Network Temporary Identifier). For example, some packets of the wireless PTP can be transmitted in a SystemInformationBlock (SIB) as part of the system information broadcast. In another example, the SIB carrying PTP packets can be transmitted on-demand by the serving JAB node, e.g., donor node device 221, based on receiving a request, such as a RRCSystemInfoRequest from the child JAB node(s), e.g., from the relay node device 222.

Scheduling, quality-of-service (QoS) control, and route management can ensure that PTP packets are delivered to relay node device 222 with low latency and high reliability. For example, donor node device 221 can adjust the frame structure (namely, which subframes can be used to transmit and receive, respectively) or PDSCH/PUSCH transmission durations for that purpose. In addition to a PTP master clock, boundary clocks can be used at one or more network node devices within the exemplary cellular communications network 200. As an example, referring back to FIG. 2, if donor node device 220 or second base station node device 221 comprises a GPS receiver, then either of devices 220, 221 can serve as a boundary clock and serve as a root timing reference, and can thus improve overall synchronization accuracy. A root timing reference (grandmaster) clock can be located within the radio access network (e.g., in any of network nodes 220, 221, or 222 illustrated in FIG. 2) or within the core network 250.

Figure 4:
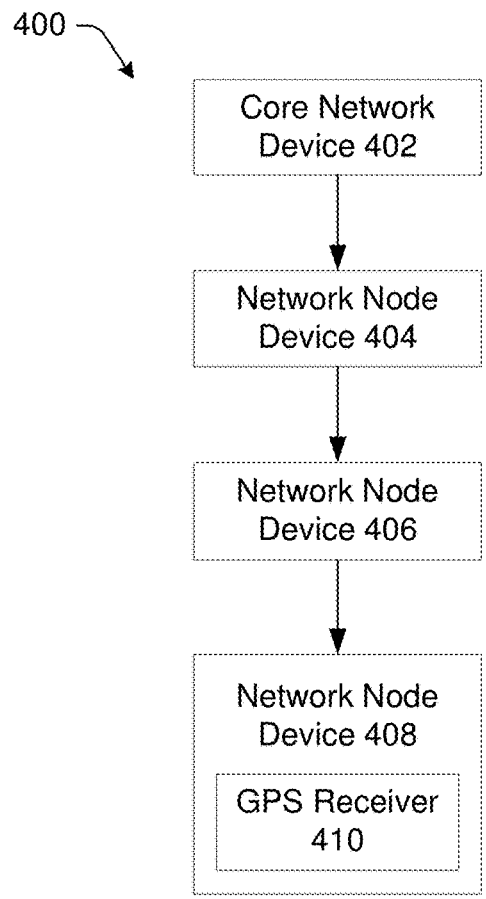
FIG. 4 illustrates an example multi-hop integrated access and backhaul network in accordance with various aspects and embodiments of the subject disclosure.

FIG. 4 illustrates an example multi-hop integrated access and backhaul network in accordance with various aspects and embodiments of the subject disclosure. The example multi-hop integrated access and backhaul network 400 comprises core network device 402, network node device 404, network node device 406, and network node device 408. Network node device 408 includes GPS receiver 410. Core network device 402 can be, e.g., a device in core network 250 illustrated in FIG. 2. Similarly, network node devices 404, 406 and 408 can correspond to network node devices 220, 221, and 222, respectively, illustrated in FIG. 2.

In an example embodiment, core network device 402 can be connected to a network node device 404. Network node device 404 can serve as a donor node for network node device 406. Network node device 404 can furthermore serve as a master node with regards to over-the-air timing synchronization for network node device 406. Network node device 406 can in turn serve as a master node for over-the-air timing synchronization for network node device 408. Network node device 408 need not use network node device 404 as a timing reference. Instead, network node device 408 can use the closer network node device 406 as a timing reference, and network node device 408 can thereby avoid issues with low SINR and propagation losses. In an embodiment, network node device 408 can have a GPS receiver 410 which can be used a master timing reference to improve synchronization within the multi-hop integrated access and backhaul network 400.

Figure 5:
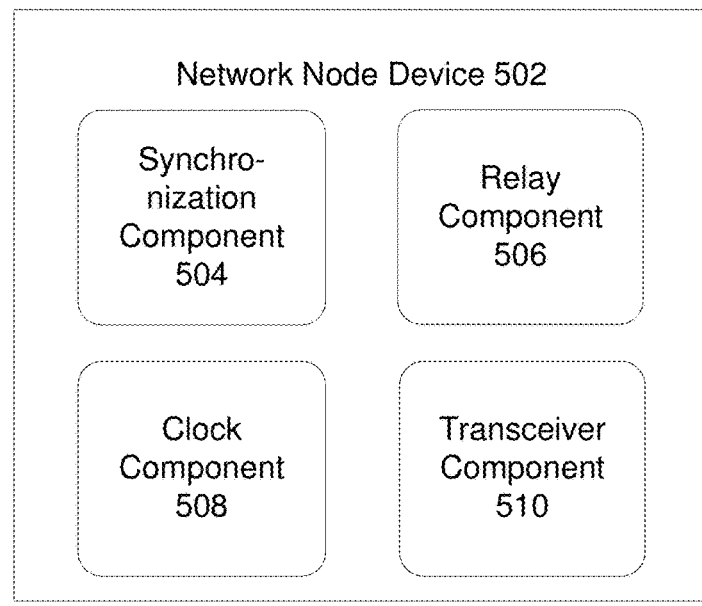
FIG. 5 is a block diagram illustrating an example network node device that can establish timing synchronization with another network node device in accordance with various aspects and embodiments of the subject disclosure.

FIG. 5 is a block diagram illustrating an example network node device that can establish timing synchronization with another network node device in accordance with various aspects and embodiments of the subject disclosure. FIG. 5 includes an example network node device 502 which comprises a synchronization component 504, a relay component 506, a clock component 508, and a transceiver component 510. Network node device 502 can comprise, e.g., any of the network node devices 404, 406, or 408 illustrated in FIG. 4.

In various example embodiments, network node device 502 can establish timing synchronization with another network node device configured similarly to network node device 502. In an embodiment, network node device 502 can serve as both a relay node, receiving timing synchronization from a donor node device elsewhere, and likewise, network node device 502 can serve as a donor node device for another network node device of a higher hop order.

Figure 6:
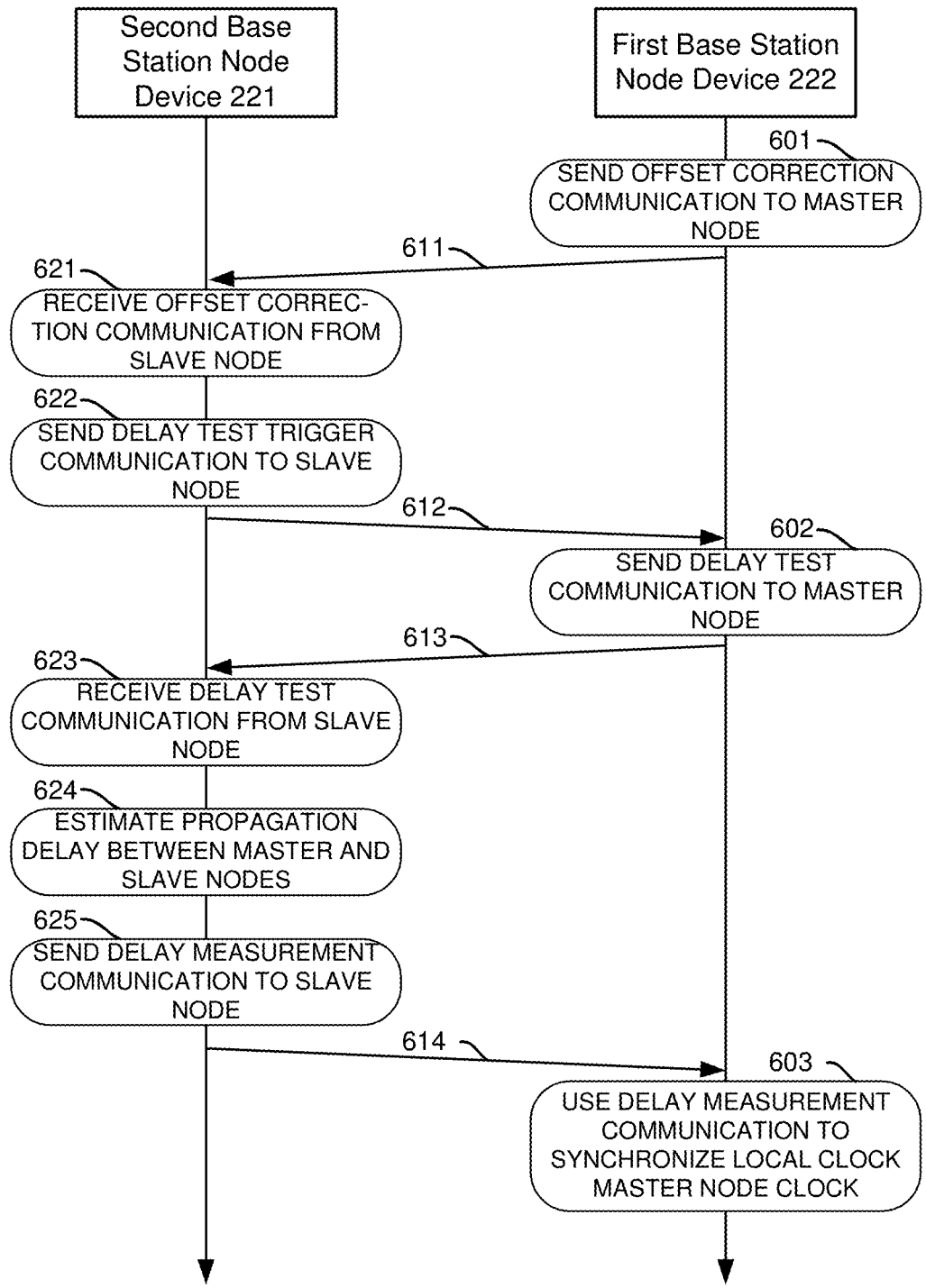
FIG. 6 illustrates example operations of a first base station node device and a second base station node device to measure and compensate for communications delays, in accordance with various aspects and embodiments of the subject disclosure.
Figure 7:
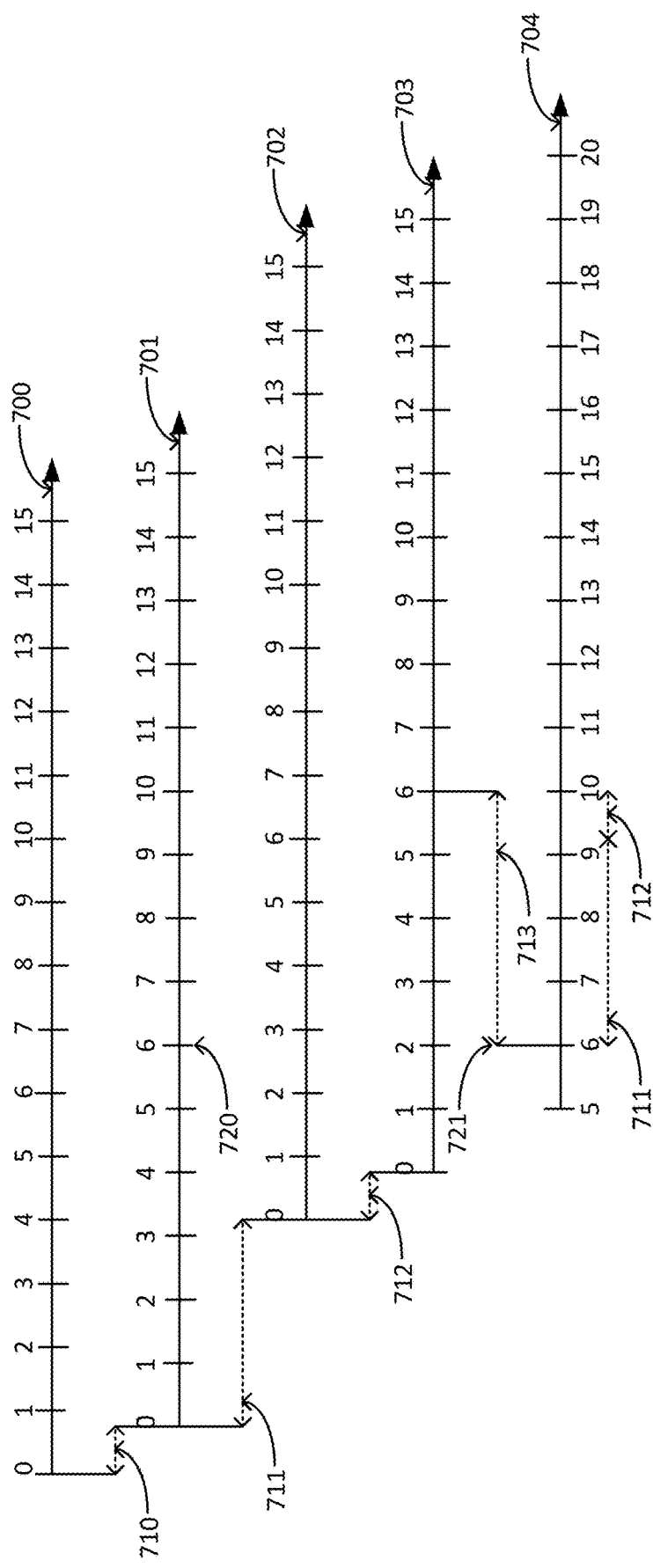
FIG. 7 illustrates example communication delays, including propagation delay and processing delay, which can be measured and used to synchronize timing in accordance with various aspects and embodiments of the subject disclosure.
Figure 8:
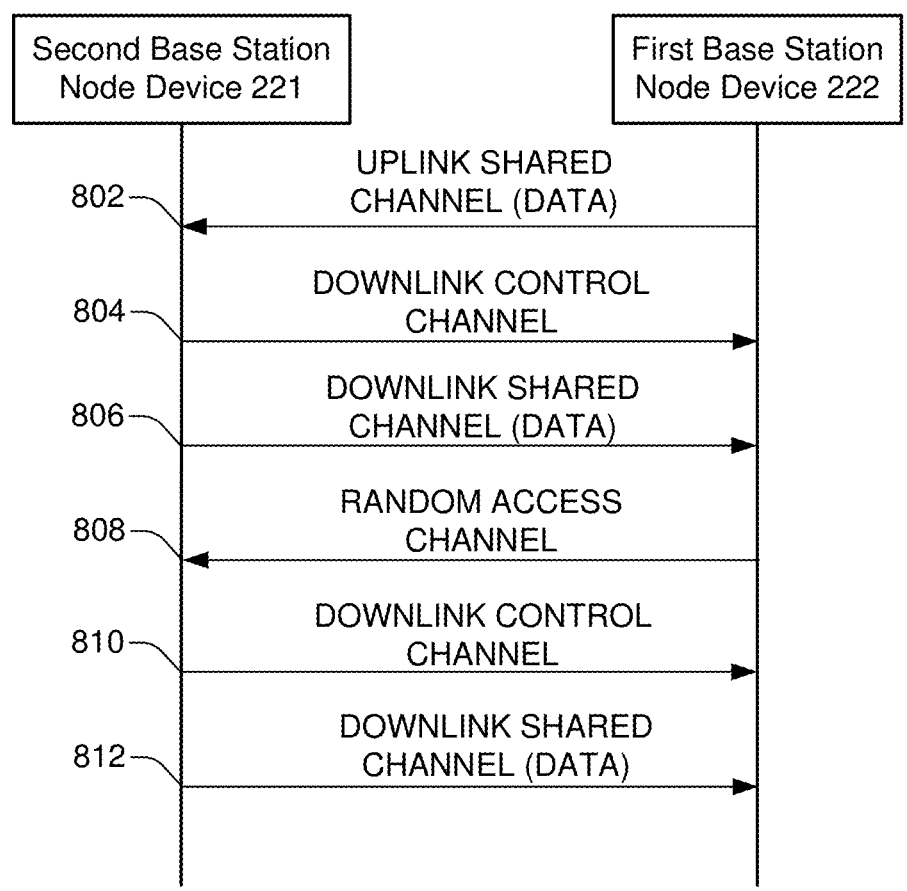
FIG. 8 provides an example message sequence to synchronize timing of wireless transmissions via a wireless backhaul connection between a first base station node device and a second base station node device, in accordance with various aspects and embodiments of the subject disclosure.

Relay component 506 can facilitate establishing a relay/donor node relationship with another network node device, for example by managing the issuance of the messages and signals depicted in FIGS. 3, 6, and 8. Relay component 506 can determine whether the network node device 502 is to act as a relay node (e.g., slave device) or a donor node (e.g., master device) with respect to the synchronization protocol. Once the relationship is established, synchronization component 504 can perform synchronization according to the wireless PTP, along with further delay measurements described in connection with FIGS. 6, 7, and 8, and synchronization component 504 can determine the adjustment of the frame structure, issuing or applying a received timing advance, and other synchronization functionality. In an embodiment, the clock component 508 can be used as a master clock, when network node device 502 acts as a donor node, or the clock component 508 can be adjusted based on the synchronization process, when network node device 502 acts as a relay node. The transceiver component 510 can facilitate sending and receiving the messages relating to establishing the donor/relay relationship and timing synchronization, along with other communications sent or received by network node device 502.

FIG. 6 illustrates example operations of a first base station node device and a second base station node device to measure and compensate for communications delays, in accordance with various aspects and embodiments of the subject disclosure. FIG. 6 illustrates a series of operations at each of a first base station node device 222 and a second base station node device 221, as well as communications between the devices 221, 222. In some embodiments, the operations illustrated in FIG. 6 may be performed along with operations of a wireless PTP such as illustrated in FIG. 3, in order to more accurately synchronize timing of wireless transmissions via a wireless backhaul connection between first base station node device 222 and second base station node device 221.

In an aspect, FIG. 6 provides an approach to measure and compensate for communications delays, including in particular, propagation delay. A waveform transmitted at a network node, e.g., second base station node device 221, propagates over the air approximately at the speed of light. The time it takes for the waveform to travel from the second base station node device 221 antennas to antennas of another network node, e.g., first base station node device 222, is propagation delay. Propagation delay is discussed further herein with reference to FIG. 7.

At 601, first base station node device 222, which in this example can be viewed as a slave node or a relay node of hop order n, can send an offset correction communication, e.g., an offset correction command, to second base station node device 221, which in this example can be viewed as a donor node or a master node of hop order n-1. The offset correction communication can be transmitted via an over-the-air waveform 611 to second base station node device 221.

At 621, second base station node device 221 can receive the offset correction communication. At 622, second base station node device 221 can send a delay test trigger communication, e.g., a contention-free PRACH trigger, to first base station node device 222. The delay test trigger communication can optionally be transmitted to first base station node device 222 via a communication 612, such as, e.g., a PDCCH. Alternatively, communication 612 can be sent via a PDSCH transmission scheduled by a PDCCH transmission.

At 602, first base station node device 222 can receive the delay test trigger communication in communication 612, and first base station node device 222 can send a delay test communication, e.g., a contention-free PRACH, in 613. At 623, second base station node device 221 can receive the delay test communication. At 624, second base station node device 221 can use the delay test communication, optionally in addition to information known about the delay test communication, such as send and receive times thereof, to estimate the propagation delay between second base station node device 221 and first base station node device 222.

At 625, second base station node device 221 can send a delay measurement communication comprising the estimated propagation delay, to first base station node device 222. The delay measurement communication can be included in a communication 614, e.g., a PDSCH scheduled by a PDCCH. At 603, first base station node device 222 can receive the delay measurement communication included in communication 614, and first base station node device 222 can correct its clock to adjust for communication delays specified in the delay measurement communication.

FIG. 7 illustrates example communication delays, including propagation delay and processing delay, which can be measured and used to synchronize timing in accordance with various aspects and embodiments of the subject disclosure. In FIG. 7, a master node, e.g., second base station node device 221 in FIG. 6, of hop order n-1, has a baseband time 700 and a radio frequency (RF) time 701. The RF time 701 can define events at an RF antenna connector of the master node. For example, an event 720 in RF time 701 can comprise the transmission of a waveform by the RF antenna connector of the master node.

Baseband time 700 and RF time 701 can be offset by a processing delay 710. For example, the master node can prepare transmissions such as synchronization signals and channels, broadcast channel transmissions, or unicast control and data transmissions, in reference to the base band time 700. Channel processing and encoding of the information carried on these channels takes time, the so-called processing delay. Between the preparation of a transmission in the baseband time 700 and actual transmission of the waveform in RF time 701, processing delay 710 passes.

As noted herein, a waveform transmitted at a master node propagates over the air approximately at the speed of light. The time it takes for the waveform to travel from the master node antennas to the slave node antennas, e.g., antennas of a relay node of hop order n, such as first base station node device 222 in FIG. 6, is propagation delay 711.

Like the master node, the slave node has a baseband time 703 and a RF time 702. Slave node RF time 702 is the RF time reference at the slave node. RF time 702 can define events at the RF antenna connectors at the slave node. The slave node RF time 702 is shifted from the master node RF time 701 by the propagation delay 711.

Between receiving a waveform at the slave node antenna connector and decoding the information carried on a waveform, processing delay 712 passes. For example, the slave node receiver may have to perform channel estimation, equalization, demodulation, decoding, and so forth. These can be baseband events defined with reference to baseband time 703.

As can be seen in FIG. 7, the master node RF time 701 is offset with respect to the master node baseband time 700. Furthermore, the slave node RF time 702 is offset with respect to the master node RF time 701, and the slave node baseband time 703 is offset with respect to the slave node RF time 702.

In some embodiments, baseband times can be determined at base station transmitter functions of IAB nodes, which may have separate hardware or software implementations from UE receiver functions of IAB nodes. In this case, processing delays may additionally include time elapsed for internally exchanging the information of the received waveform between the UE receiver and base station functions of the IAB node (e.g. via a data packet of the backhaul adaptation protocol or other proprietary interface) and time elapsed for processing the information at the base station function of the IAB node.

The processing delay 710 can be known to the master node by implementation. Similarly, the processing delay 712 can be known to the slave node by implementation. Hence, master and slave nodes can internally correct for processing delays 710 and 712, respectively. What is unknown is the propagation delay 711. Propagation delay 711 depends on the propagation environment and network topology and unlike processing delays 710 and 712, propagation delay 711 is not deterministic. Hence, aspects of this disclosure provide techniques to estimate and subsequently correct for propagation delay 711.

An example delay correction 713 can align event 720 at the master node with event 721 at the slave node by shifting baseband time reference 703 at the slave node by delay correction 713 to obtain a shifted baseband time reference 704 at the slave node. In this example, delay correction 713 includes the propagation delay 711 plus the processing delay 712, and so the shifted baseband time reference 704 is aligned with the master node RF time 701.

In the example in FIG. 7, the offset correction 713 comprises the propagation delay 711 as well as the processing delay 712 at the slave node. This is because the RF time reference 701 at the master node can be aligned with the baseband time reference 703 at the slave node. Because the processing delays 710, 712 are deterministic and known, other offset corrections 713 can be envisioned by those of skill in the art, e.g., an offset correction 713 can include the propagation delay 711 alone, which would align the RF time 701 at the master node with the RF time 702 at the slave node.

FIG. 8 provides an example message sequence to synchronize timing of wireless transmissions via a wireless backhaul connection between a first base station node device and a second base station node device, in accordance with various aspects and embodiments of the subject disclosure. FIG. 8 illustrates a second base station node device 221 and a first base station node device 222, introduced in FIG. 2, along with a series of communications between the devices 221 and 222.

At 802, first base station node device 222 can send an offset correction command to second base station node device 221, in the form of uplink shared channel data. In an example embodiment, the uplink shared channel data can comprise an offset correction command in a physical uplink shared channel (PUSCH) transmission. If first base station node device 222 does not have an uplink grant for a PUSCH transmission, it may request one from second base station node device 221 via a scheduling request (SR).

At 804 and 806, second base station node device 221 can send a delay test trigger communication to first base station node device 222, in the form of downlink control channel information and/or downlink shared channel data. In an example embodiment, at 804, the downlink control channel information can comprise a contention-free PRACH trigger in a PDCCH order. When a PDCCH order is used, operation 806 can be omitted. Alternatively, at 806, the delay test trigger communication can be sent in a PDSCH and the PDCCH of operation 804 can schedule the PDSCH of operation 806.

At 808, first base station node device 222 can send a delay test communication to second base station node device 221, in the form of a random access channel. In an example embodiment, the random access channel can comprise a PRACH.

In response to receiving the delay test communication, second base station node device 221 can use the delay test communication to estimate propagation delay. For example, second base station node device 221 can use the PRACH to estimate propagation delay. At 810 and 812, second base station node device 221 can send a delay measurement communication, comprising a propagation delay estimate, to first base station node device 222. The delay measurement communication can be in the form of downlink control channel information. For example, downlink control channel information can comprise a PDSCH sent at operation 812, which can be scheduled by a PDCCH sent at operation 810.

In some embodiments, the contention-free PRACH trigger 311 can be sent using a PDCCH order at operation 804. First base station node device 222 can initially receive synchronization signal 306 and possibly broadcast channel 308 from second base station node device 221, as illustrated in FIG. 3, to obtain coarse time and frequency synchronization. First base station node device 222 can then align its RF time, e.g., RF time 702 in FIG. 7, according to when synchronization signal 306 is received. First base station node device 222 can initially assume zero propagation delay.

First base station node device 222 can prepare a PRACH transmission using baseband time reference 703 with an assumed propagation delay 711 of zero, such that the actual PRACH transmission occurs at RF time reference 702 assuming a propagation delay 711 of zero, taking into account the processing time 712 at first base station node device 222 to prepare the PRACH transmission.

Second base station node device 221 can record the time when the PRACH is received, in baseband time 700. Second base station node device 221 can then translate the reception time of the PRACH into RF time 701, using the deterministic processing delay 710.

Similarly, due to knowledge of processing delay 710, second base station node device 221 knows the time when synchronization signal 306 was sent in RF time 701. From the difference between the time of transmission of synchronization signal 306 in RF time 701 and the time of receiving PRACH at operation 809, in RF time 701, second base station node device 221 can calculate the propagation delay 711. In case of TDD operation, in addition to the processing time, the second base station node device 221 may also subtract the transient period which is the time period during which the transmitter is changing from the transmitter OFF period to the transmitter ON period, or vice versa, when calculating propagation delay estimates.

After estimating propagation delay, second base station node device 221 can send the propagation delay estimate in a PDSCH at operation 812, wherein the PDSCH can be scheduled by a PDCCH at operation 810.

In another embodiment, second base station node device 221 can send the contention-free PRACH trigger to first base station node device 222 in a PDSCH, at operation 806, scheduled by a PDCCH transmission at operation 804. In addition to the delay test trigger, the PDSCH at operation 806 can comprise a time stamp. The time stamp can comprise, for example, a Coordinated Universal Time (UTC) corresponding to a system frame number (SFN) boundary at or immediately after the ending boundary of the system information (SI) window in which a given SystemInformationBlock (SIB) is transmitted. The SIB contains a field that counts UTC seconds in 10 nanosecond (ns) units.

First base station node device 222 can send the PRACH of operation 808 at an RF time 702 corresponding to the time stamp in the PRACH trigger carried in the PDSCH of operation 806. Second base station node device 221 can record reception of the PRACH in RF time 701 and translate it into UTC, thereby obtaining an estimate for the propagation delay 711. Second base station node device 221 can then send the propagation delay estimate in a PDSCH at operation 812, scheduled by a PDCCH at operation 810.

In some embodiments, the slave node, e.g., first base station node device 222, can autonomously track and correct for propagation delay using reference signal transmissions from second base station node device 221. Such reference signal transmissions can include transmissions of tracking reference signals (TRS), synchronization signals (PSS/SSS), channel state information reference signals (CSI-RS) or any other reference signal suitable for tracking the propagation delay at the slave node.

Furthermore, the master node, e.g., second base station node device 221, can also autonomously monitor propagation delay for changes, e.g., by tracking reference signal transmissions from the slave node, including sounding reference signal (SRS) transmissions and demodulation reference signal (DMRS) transmissions. If the master node notices a change in the propagation delay, it can send a correction command to the slave node without the slave node requesting such a correction command and sending a PRACH to the master node. For example, the master node may send such a correction command as a multiple access control (MAC) control element (CE) multiplexed in a PDSCH transmission to the slave node.

Figure 9:
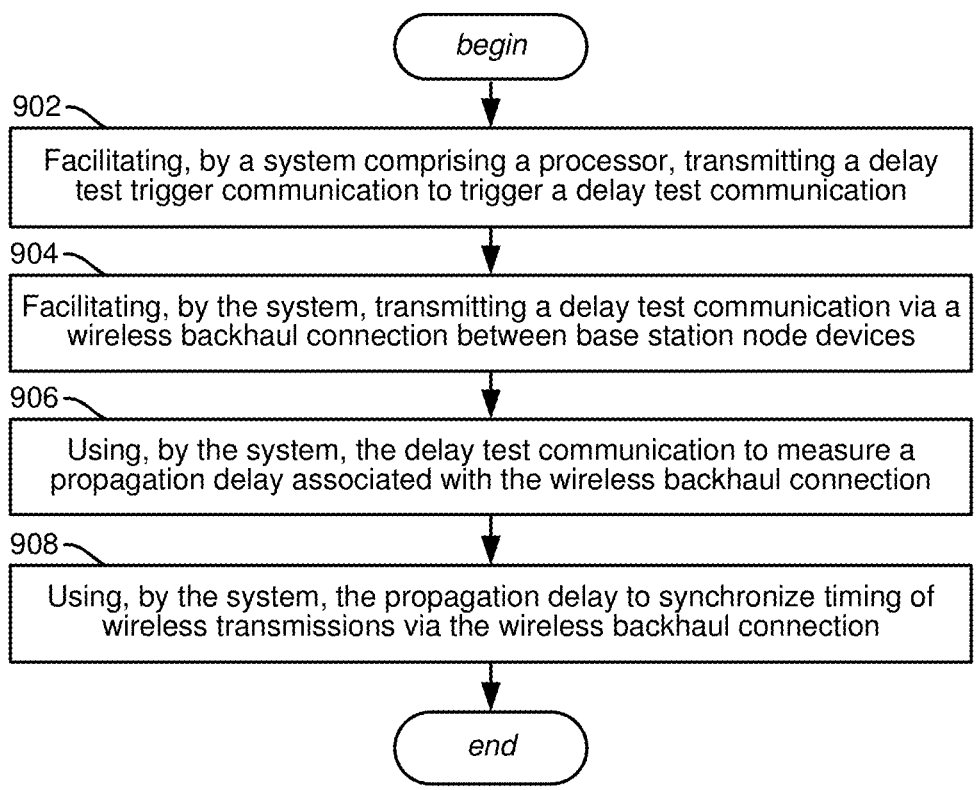
FIG. 9 is a flow diagram representing example network operations, in accordance with various aspects and implementations of the subject disclosure.

One or more aspects, such as implemented in a machine-readable storage medium, comprising executable instructions that, when executed by a processor, facilitate performance of operations, are represented in FIG. 9. FIG. 9 illustrates example network operations in accordance with various aspects and implementations of the subject disclosure. While the operations are illustrated in an example sequence, the operations can be eliminated, combined, or re-ordered in some embodiments.

Example operations comprise operation 902, which represents facilitating, by a system comprising a processor, transmitting a delay test trigger communication to trigger a delay test communication. For example, as illustrated in FIG. 6, second base station node device 221 can send a delay test trigger communication to first base station node device 222, at operation 622.

Example operations comprise operation 904, which represents facilitating, by the system, transmitting a delay test communication via a wireless backhaul connection between base station node devices. For example, as illustrated in FIG. 6, first base station node device 222 can send a delay test communication to second base station node device 221, at operation 602. The delay test communication can comprise, e.g., a physical random access channel communication as described herein.

Example operations comprise operation 906, which represents using, by the system, the delay test communication to measure a propagation delay associated with the wireless backhaul connection. For example, as illustrated in FIG. 6, operation 624, second base station node device 221 can use the delay test communication received at operation 623 to measure a propagation delay associated with the wireless backhaul connection between second base station node device 221 and first base station node device 222. In some embodiments, second base station node device 221 can determine a time difference between the delay test trigger communication and the delay test communication, e.g., a time difference between sending the delay test trigger communication and receiving the delay test communication. Alternatively, second base station node device 221 can determine a time difference between a time indicated in the delay test trigger communication, e.g., a time at which the first base station node device 222 is instructed to send the delay test communication, and a time associated with the delay test communication, such as a time at which the delay test communication is received.

Operation 906 can comprise translating between a baseband time reference at a base station node device, e.g., baseband time 700 at second base station node device 221, and a RF time reference at the base station node device, e.g., RF time 701 at second base station node device 221. Such translation may allow for accurate measurement of propagation delay.

Example operations comprise operation 908, which represents using, by the system, the propagation delay to synchronize timing of wireless transmissions via the wireless backhaul connection. For example, as illustrated in FIG. 6, first base station node device 222 can use the propagation delay measured at operation 906 to implement a delay correction for, e.g., RF time at the first base station node device 222.

Figure 10:
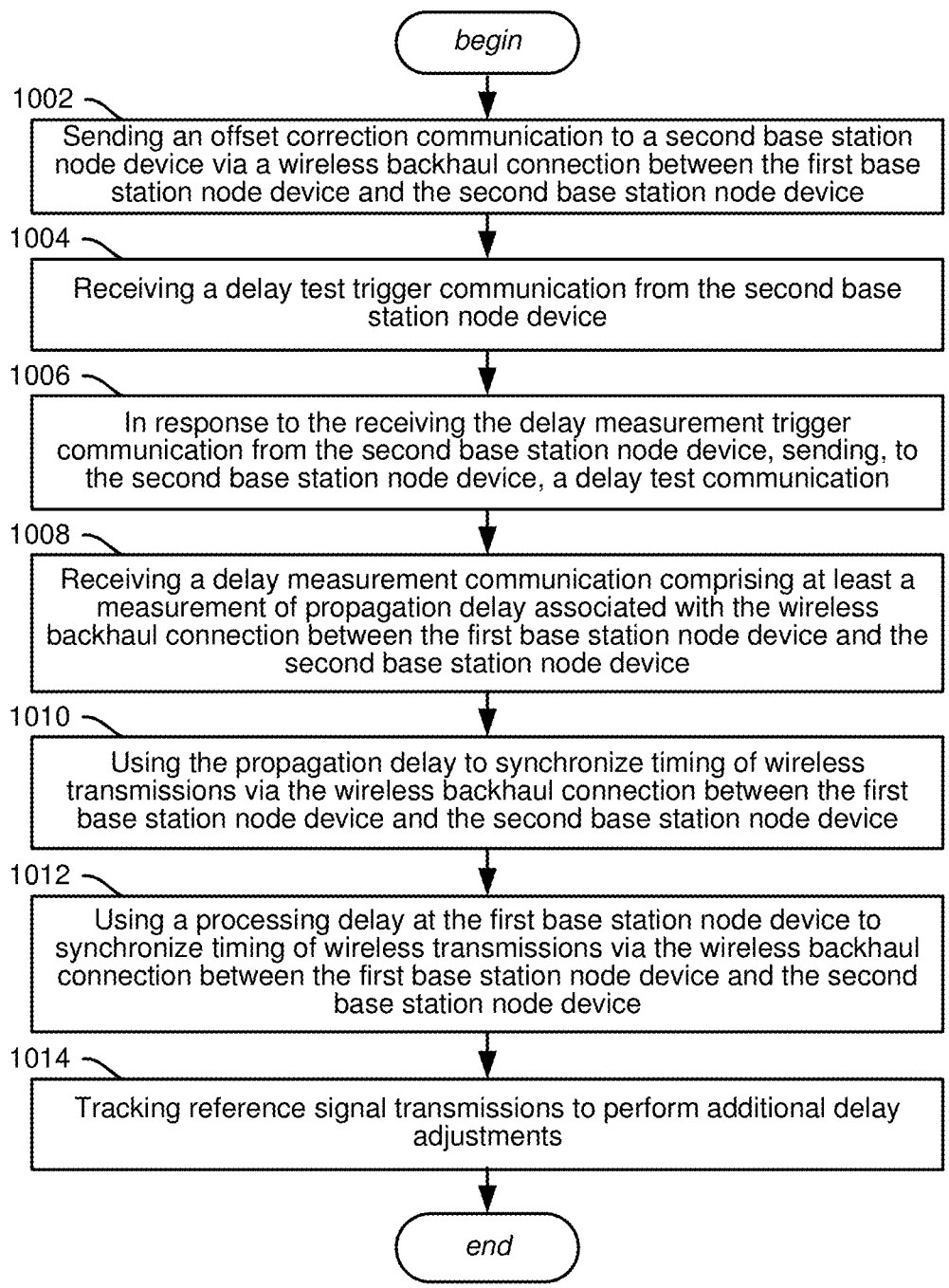
FIG. 10 is a flow diagram representing example operations of a first base station node device, in accordance with various aspects and implementations of the subject disclosure.

One or more aspects, such as implemented in a machine-readable storage medium, comprising executable instructions that, when executed by a processor, facilitate performance of operations, are represented in FIG. 10. FIG. 10 is a flow diagram representing example operations of a first base station node device, in accordance with various aspects and implementations of the subject disclosure. While the operations are illustrated in an example sequence, the operations can be eliminated, combined, or re-ordered in some embodiments.

Example operations comprise operation 1002, which represents sending an offset correction communication to a second base station node device via a wireless backhaul connection between the first base station node device and the second base station node device. For example, with reference to FIG. 2, first base station node device 222 can send an offset correction communication to second base station node device 221 via wireless backhaul connection 261. The offset correction communication can optionally comprise a physical uplink shared channel transmission, as described herein.

Example operations comprise operation 1004, which represents receiving a delay test trigger communication from the second base station node device. For example, with reference to FIG. 2, first base station node device 222 can receive a delay test trigger communication from second base station node device 221.

Example operations comprise operation 1006, which represents in response to the receiving the delay measurement trigger communication from the second base station node device, sending, to the second base station node device, a delay test communication. For example, with reference to FIG. 2, first base station node device 222 can send a delay test communication to second base station node device 221. The delay test communication can comprise, e.g., a physical random access channel communication. In some embodiments, the delay test communication can be sent at a time indicated in the delay test trigger communication received at operation 1004.

Example operations comprise operation 1008, which represents receiving a delay measurement communication comprising at least a measurement of propagation delay associated with the wireless backhaul connection between the first base station node device and the second base station node device. For example, with reference to FIG. 2, first base station node device 222 can receive, from second base station node device 221, a delay measurement communication comprising at least a measurement of propagation delay associated with the wireless backhaul connection 261 between the first base station node device 222 and the second base station node device 221. The measurement of propagation delay can be based on the delay test communication sent at operation 1006, because second base station node device 221 can use the delay test communication to calculate propagation delay.

Example operations comprise operation 1010, which represents using the propagation delay to synchronize timing of wireless transmissions via the wireless backhaul connection between the first base station node device and the second base station node device. For example, with reference to FIG. 2, first base station node device 222 can use the propagation delay received at operation 1008 to synchronize timing of wireless transmissions via the wireless backhaul connection 261, e.g., by generating and using a shifted baseband time reference 704, or otherwise shifting one or more clocks at first base station node device 222 to better align with clocks at the master node.

Example operations comprise operation 1012, which represents using a processing delay at the first base station node device to synchronize timing of wireless transmissions via the wireless backhaul connection between the first base station node device and the second base station node device. For example, with reference to FIG. 7, first base station node device 222 can use processing delay 712 to synchronize timing, e.g., by adding processing delay 712 to propagation delay 711 in order to generate shifted baseband time reference 704.

Example operations comprise operation 1014, which represents tracking reference signal transmissions to perform additional delay adjustments. For example, with reference to FIG. 2, first base station node device 222 can track reference signal transmissions from the second base station node device 221, use the reference signal transmissions to determine additional propagation delays as described herein, and use the additional propagation delays to synchronize timing of wireless transmissions via the wireless backhaul connection 261.

Figure 11:
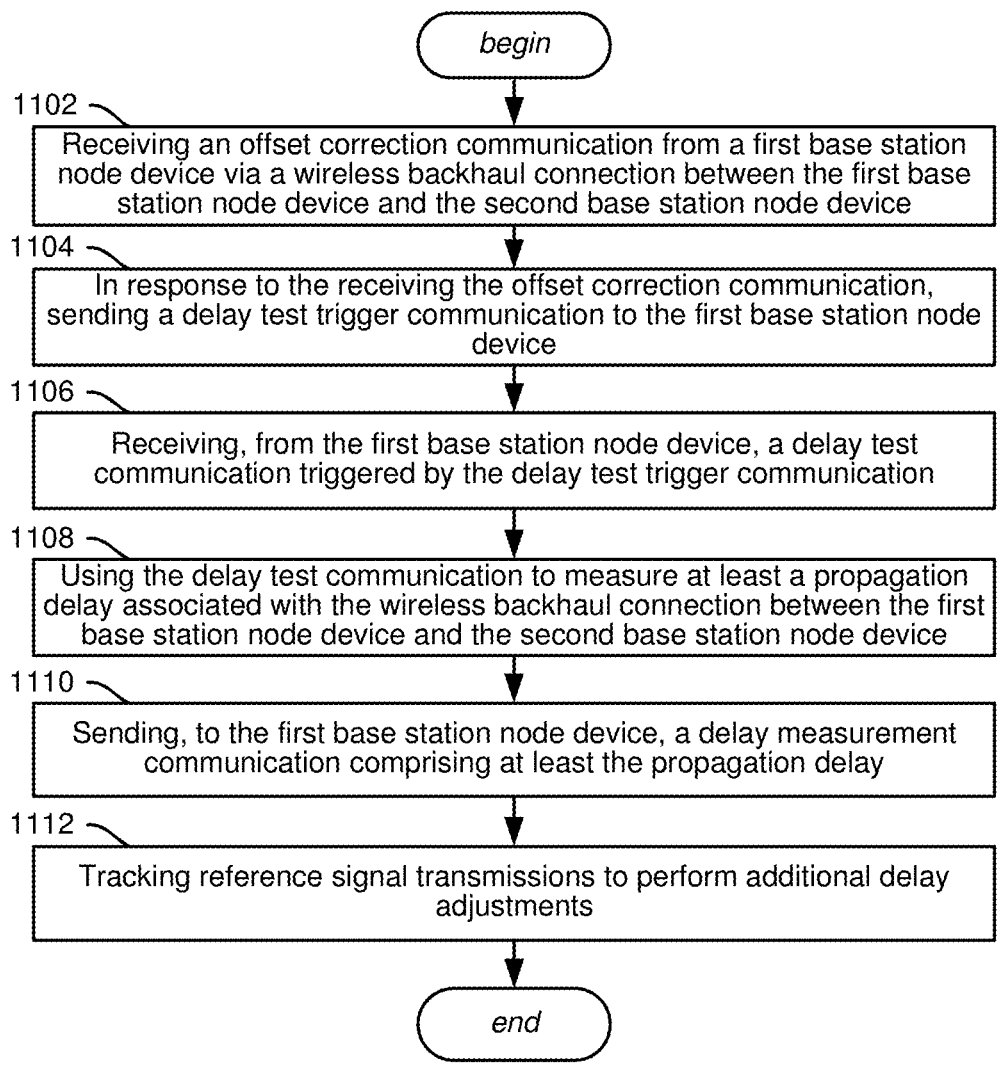
FIG. 11 is a flow diagram representing example operations of a second base station node device, in accordance with various aspects and implementations of the subject disclosure.

One or more aspects, such as implemented in a machine-readable storage medium, comprising executable instructions that, when executed by a processor, facilitate performance of operations, are represented in FIG. 11. FIG. 11 is a flow diagram representing example operations of a second base station node device, in accordance with various aspects and implementations of the subject disclosure. While the operations are illustrated in an example sequence, the operations can be eliminated, combined, or re-ordered in some embodiments.

Example operations comprise operation 1102, which represents receiving an offset correction communication from a first base station node device via a wireless backhaul connection between the first base station node device and the second base station node device. For example, with reference to FIG. 2, second base station node device 221 can receive an offset correction communication from a first base station node device 222 via wireless backhaul connection 261.

Example operations comprise operation 1104, which represents in response to the receiving the offset correction communication, sending a delay test trigger communication to the first base station node device. For example, with reference to FIG. 2, second base station node device 221 can send a delay test trigger communication to the first base station node device 222.

Example operations comprise operation 1106, which represents receiving, from the first base station node device, a delay test communication triggered by the delay test trigger communication. For example, with reference to FIG. 2, second base station node device 221 can receive, from the first base station node device 222, a delay test communication.

Example operations comprise operation 1108, which represents using the delay test communication to measure at least a propagation delay associated with the wireless backhaul connection between the first base station node device and the second base station node device. For example, with reference to FIG. 2, second base station node device 221 can use the delay test communication to measure propagation delay associated with the wireless backhaul connection 261.

Example operations comprise operation 1110, which represents sending, to the first base station node device, a delay measurement communication comprising at least the propagation delay. For example, with reference to FIG. 2, second base station node device 221 can send a delay measurement communication to the first base station node device 222. The propagation delay is applicable at the first base station node device 222 to synchronize timing of wireless transmissions via the wireless backhaul connection 261.

Example operations comprise operation 1112, which represents tracking reference signal transmissions to perform additional delay adjustments. For example, with reference to FIG. 2, second base station node device 221 can track reference signal transmissions from the first base station node device 222, use the reference signal transmissions to determine additional propagation delays, and sending additional delay measurement trigger communications to the first base station node device 222 to correct for the additional propagation delays.

Figure 12:
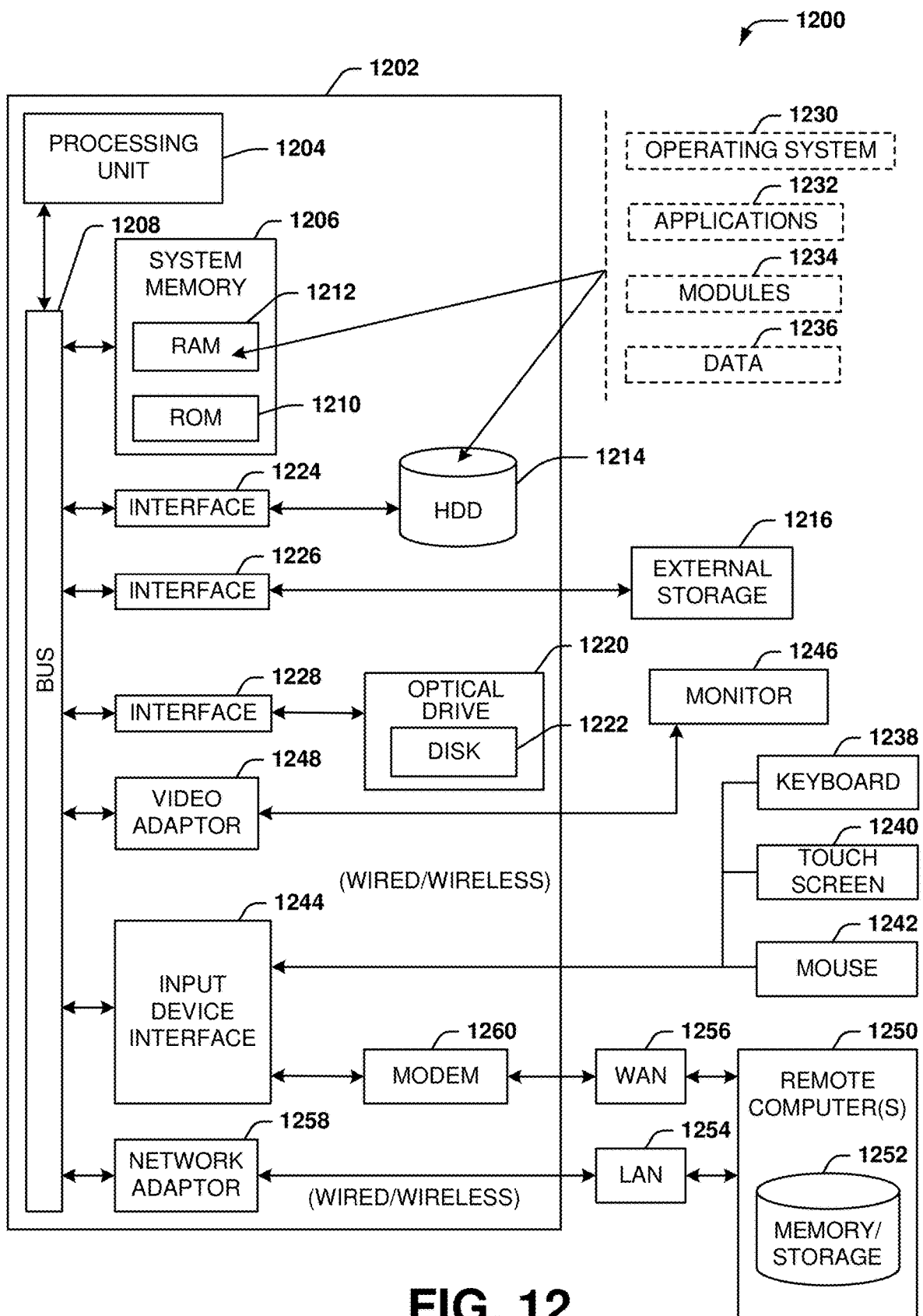
FIG. 12 is a block diagram of an example computer that can be operable to execute processes and methods in accordance with various aspects and embodiments of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A first base station node device, comprising:
a processor; and
a memory that stores executable instructions that, when executed by the processor, facilitate performance of operations, comprising:
sending an offset correction communication to a second base station node device via a wireless backhaul connection between the first base station node device and the second base station node device;
receiving a delay test trigger communication from the second base station node device;
in response to receiving the delay test trigger communication from the second base station node device, sending, to the second base station node device, a delay test communication;
receiving a delay measurement communication comprising at least a measurement of propagation delay associated with the wireless backhaul connection between the first base station node device and the second base station node device, wherein the measurement of propagation delay is based on the delay test communication; and
using the propagation delay to synchronize timing of wireless transmissions via the wireless backhaul connection between the first base station node device and the second base station node device.

2. The first base station node device of claim 1, wherein the delay test communication comprises a physical random access channel communication.

3. The first base station node device of claim 1, wherein the offset correction communication comprises a physical uplink shared channel transmission.

4. The first base station node device of claim 1, wherein sending the delay test communication comprises sending the delay test communication at a time indicated in the delay test trigger communication.

5. The first base station node device of claim 1, wherein the operations further comprise:
tracking reference signal transmissions from the second base station node device;
using the reference signal transmissions to determine additional propagation delays; and
using the additional propagation delays to synchronize timing of wireless transmissions via the wireless backhaul connection between the first base station node device and the second base station node device.

6. The first base station node device of claim 1, wherein the operations further comprise using, in addition to the propagation delay, a processing delay at the first base station node device to synchronize timing of wireless transmissions via the wireless backhaul connection between the first base station node device and the second base station node device.

7. A non-transitory machine-readable medium, comprising executable instructions that, when executed by a processor of a second base station node device, facilitate performance of operations, comprising:
receiving an offset correction communication from a first base station node device via a wireless backhaul connection between the first base station node device and the second base station node device;
in response to receiving the offset correction communication, sending a delay test trigger communication to the first base station node device;
receiving, from the first base station node device, a delay test communication triggered by the delay test trigger communication;
using the delay test communication to measure at least a propagation delay associated with the wireless backhaul connection between the first base station node device and the second base station node device; and
sending, to the first base station node device, a delay measurement communication comprising at least the propagation delay, wherein the propagation delay is applicable at the first base station node device to synchronize timing of wireless transmissions via the wireless backhaul connection between the first base station node device and the second base station node device.

8. The non-transitory machine-readable medium of claim 7, wherein the delay test trigger communication comprises a contention free physical random access channel trigger communication.

9. The non-transitory machine-readable medium of claim 8, wherein the contention free physical random access channel trigger communication is sent as a physical downlink control channel or as a physical downlink shared channel transmission.

10. The non-transitory machine-readable medium of claim 7, wherein the operations further comprise sending, to multiple base station node devices, the delay test trigger communication.

11. The non-transitory machine-readable medium of claim 7, wherein using the delay test communication to measure at least the propagation delay associated with the wireless backhaul connection between the first base station node device and the second base station node device comprises determining a time difference between sending the delay test trigger communication and receiving the delay test communication.

12. The non-transitory machine-readable medium of claim 7, wherein using the delay test communication to measure at least the propagation delay associated with the wireless backhaul connection between the first base station node device and the second base station node device comprises determining a time difference between a first time indicated in the delay test trigger communication and a second time associated with the receiving the delay test communication.

13. The non-transitory machine-readable medium of claim 7, wherein using the delay test communication to measure at least the propagation delay associated with the wireless backhaul connection between the first base station node device and the second base station node device comprises translating between a baseband time reference at the second base station node device and a radio frequency time reference at the second base station node device to account for a processing delay at the second base station node device.

14. The non-transitory machine-readable medium of claim 7, wherein the operations further comprise:
tracking reference signal transmissions from the first base station node device;
using the reference signal transmissions to determine additional propagation delays; and
sending additional delay measurement trigger communications to the first base station node device to correct for the additional propagation delays.

15. A method, comprising:
sending, by a first base station node device, an offset correction communication to a second base station node device via a wireless backhaul connection between the first base station node device and the second base station node device;

receiving, by the first base station node device, a delay test trigger communication from the second base station node device;

in response to the delay test trigger communication, facilitating, by the first base station node device, transmitting a delay test communication via the wireless backhaul connection;

receiving, by the first base station node device, a delay measurement communication comprising at least a measurement of propagation delay associated with the wireless backhaul connection between the first base station node device and the second base station node device; and using, by the first base station node device, the propagation delay to synchronize timing of wireless transmissions via the wireless backhaul connection.

16. The method of claim 15, wherein the delay test trigger communication comprises a contention-free physical random access channel trigger.

17. The method of claim 16, wherein using the delay test communication to measure the propagation delay comprises determining a time difference between the delay test trigger communication and the delay test communication.

18. The method of claim 16, wherein using the delay test communication to measure the propagation delay comprises determining a time difference between a time indicated in the delay test trigger communication and a time associated with the delay test communication.

19. The method of claim 15, wherein using the delay test communication to measure the propagation delay comprises translating between a baseband time reference at a base station node device of the base station node devices and a radio frequency time reference at the base station node device.

20. The method of claim 15, wherein the delay test communication comprises a physical random access channel communication.

* * * * *